US010841744B2

(12) United States Patent
Patil et al.

(10) Patent No.: US 10,841,744 B2
(45) Date of Patent: Nov. 17, 2020

(54) SELF-HEALING MESH NETWORK BASED LOCATION TRACKING AND INFORMATION EXCHANGE USING DRONES AS MOBILE ACCESS POINT

(71) Applicant: Honeywell International Inc., Morris Plains, NJ (US)

(72) Inventors: Swapnil Gopal Patil, Thane (IN); Cleopatra Cabuz, Eden Prairie, MN (US); Veerender Sura, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/093,501

(22) PCT Filed: Apr. 5, 2017

(86) PCT No.: PCT/US2017/026046
§ 371 (c)(1),
(2) Date: Oct. 12, 2018

(87) PCT Pub. No.: WO2017/189198
PCT Pub. Date: Nov. 2, 2017

(65) Prior Publication Data
US 2020/0128359 A1    Apr. 23, 2020

(30) Foreign Application Priority Data

Apr. 29, 2016    (IN) .............................. 201611015091

(51) Int. Cl.
*H04W 4/029*    (2018.01)
*B64C 39/02*    (2006.01)
(Continued)

(52) U.S. Cl.
CPC ........... *H04W 4/029* (2018.02); *B64C 39/024* (2013.01); *H04W 24/02* (2013.01);
(Continued)

(58) Field of Classification Search
None
See application file for complete search history.

(56) References Cited

U.S. PATENT DOCUMENTS

| 6,449,558 B1 | 9/2002 | Small |
| 7,091,852 B2 | 8/2006 | Mason et al. |

(Continued)

FOREIGN PATENT DOCUMENTS

| CN | 101187702 A | 5/2008 |
| CN | 101349744 A | 1/2009 |

(Continued)

OTHER PUBLICATIONS

International Application No. PCT/US2017/026046, International Search Report, dated Jul. 3, 2017, 3 pages.

(Continued)

*Primary Examiner* — Anh Vu H Ly
(74) *Attorney, Agent, or Firm* — Alston & Bird LLP

(57) ABSTRACT

Embodiments generally describe systems and methods for using mobile drones as mobile access points for a mesh network, particularly in use for firefighters, or other first responders. Embodiments described herein provide a self-healing mesh network for improved wireless communication between the first responders and the external monitors. The self-healing mesh network may comprise mechanism drones operable to be deployed around a building or emergency area, wherein the drones can act as routers capable of automatically adjusting their position (thereby healing the wireless network) based on the signal needs for each individual located within the building.

18 Claims, 3 Drawing Sheets

(51) Int. Cl.
  *H04W 24/02* (2009.01)
  *H04W 64/00* (2009.01)
  *H04W 84/00* (2009.01)
  *B64C 29/00* (2006.01)

(52) U.S. Cl.
  CPC ....... *H04W 64/006* (2013.01); *H04W 84/005* (2013.01); *B64C 29/0025* (2013.01); *B64C 2201/122* (2013.01); *B64C 2201/145* (2013.01); *B64C 2201/146* (2013.01)

(56) References Cited

U.S. PATENT DOCUMENTS

| | | | |
|---|---|---|---|
| 7,403,783 | B2 | 7/2008 | Cheok et al. |
| 7,847,734 | B2 | 12/2010 | Wu |
| 8,908,552 | B2 | 12/2014 | Evennou et al. |
| 8,983,682 | B1 | 3/2015 | Peeters et al. |
| 2003/0135324 | A1 | 7/2003 | Navab |
| 2004/0070515 | A1 | 4/2004 | Burkley et al. |
| 2005/0001720 | A1 | 1/2005 | Mason et al. |
| 2005/0005609 | A1 | 1/2005 | Coleman et al. |
| 2007/0005609 | A1 | 1/2007 | Breed |
| 2008/0246652 | A1 | 10/2008 | Lewis |
| 2009/0033499 | A1 | 2/2009 | Malik |
| 2010/0141531 | A1 | 6/2010 | Nam et al. |
| 2011/0116416 | A1 | 5/2011 | Dobson et al. |
| 2011/0130636 | A1* | 6/2011 | Daniel ................. G08B 25/016 600/301 |
| 2011/0210843 | A1 | 9/2011 | Kummetz |
| 2011/0267220 | A1 | 11/2011 | Strachan et al. |
| 2011/0311099 | A1* | 12/2011 | Derbanne ............... G06T 7/207 382/103 |
| 2012/0052884 | A1 | 3/2012 | Bogatin |
| 2012/0091260 | A1* | 4/2012 | Callou .................. A63H 27/12 244/17.13 |
| 2012/0190386 | A1 | 7/2012 | Anderson |
| 2013/0134254 | A1* | 5/2013 | Moore ..................... B64D 1/16 244/17.11 |
| 2015/0100233 | A1 | 4/2015 | Pacholski et al. |
| 2015/0161440 | A1 | 6/2015 | Chao et al. |
| 2015/0195493 | A1* | 7/2015 | Childers ................ H04N 7/181 348/143 |
| 2015/0203213 | A1* | 7/2015 | Levien ................... H04L 63/14 701/486 |
| 2015/0312774 | A1 | 10/2015 | Lau |
| 2015/0370251 | A1* | 12/2015 | Siegel .................. G05D 1/0027 701/2 |
| 2015/0379874 | A1* | 12/2015 | Ubhi .................... G01S 5/0027 701/3 |
| 2016/0261458 | A1* | 9/2016 | Huang .................... H04L 43/16 |
| 2016/0376031 | A1* | 12/2016 | Michalski ............ G08G 5/0026 701/15 |
| 2017/0013476 | A1* | 1/2017 | Suthar .................... H04W 24/02 |
| 2017/0088261 | A1* | 3/2017 | Sequeira ............. G01S 13/0209 |
| 2017/0111102 | A1* | 4/2017 | Fan ........................ H04W 24/02 |
| 2017/0205827 | A1* | 7/2017 | Rezvani ............... G05D 1/0022 |
| 2018/0231668 | A1 | 8/2018 | Xia et al. |
| 2019/0094051 | A1* | 3/2019 | Hoffmann ........... G01D 11/245 |

FOREIGN PATENT DOCUMENTS

| | | |
|---|---|---|
| CN | 101576615 A | 11/2009 |
| CN | 102325345 A | 1/2012 |
| CN | 103401922 A | 11/2013 |
| CN | 103997781 A | 8/2014 |
| CN | 108351398 A | 7/2018 |
| EP | 3427410 B1 | 2/2020 |
| IL | 118286 | 9/1996 |
| WO | 2009021068 A1 | 2/2009 |
| WO | 2015/079437 A1 | 6/2015 |
| WO | 2015092825 A2 | 6/2015 |
| WO | 2017024462 A1 | 2/2017 |
| WO | 2017189198 A1 | 11/2017 |

OTHER PUBLICATIONS

International Application No. PCT/US2017/026046, Written Opinion of the International Searching Authority, dated Jul. 3, 2017, 5 pages.
International Application No. PCT/CN2015/086477, International Search Report, dated May 4, 2016, 5 pages.
International Application No. PCT/CN2015/086477, Written Opinion of the International Searching Authority, dated May 4, 2016, 4 pages.
International Application No. PCT/CN2015/086477, International Preliminary Report on Patentability, dated Feb. 13, 2018, 5 pages.
Europe Patent Application No. 17720615.8, Communication pursuant to Rules 161(1) and 162 EPC, dated Oct. 24, 2018, 3 pages.
International Application No. PCT/US2017/026046, International Preliminary Report on Patentability, dated Oct. 30, 2018, 6 pages.
Decision to grant a European patent dated Jan. 23, 2020 for EP Application No. 17720615.
Intention to grant dated Sep. 11, 2019 for EP Application No. 17720615.
U.S. Non-Final Office Action received for U.S. Appl. No. 15/751,696, dated Jul 24, 2020.

* cited by examiner

SELF-HEALING MESH NETWORK BASED LOCATION TRACKING AND INFORMATION EXCHANGE USING DRONES AS MOBILE ACCESS POINT

CROSS-REFERENCE TO RELATED APPLICATIONS

The present application is the National Stage of International Application No. PCT/US2017/026046, filed Apr. 5, 2017 in the United States Receiving Office and entitle "Self-Haling Mesh Network Based Location Tracking And Information Exchange Using Drones As Mobile Access Point," which claims priority to India Provisional Application No. 201611015091, filed Apr. 29, 2016 in the India Patent Office and entitled "Self-Healing Mesh Network Based Firefighting Location Tracking And Information Exchange Using Drones As Moving/Mobile Access Point", both of which are hereby incorporated by reference as if reproduced in their entirety

STATEMENT REGARDING FEDERALLY SPONSORED RESEARCH OR DEVELOPMENT

Not applicable.

REFERENCE TO A MICROFICHE APPENDIX

Not applicable.

BACKGROUND

In emergency situation, such as a fire, first responders may carry wireless mobile devices when entering and working in the emergency situation. These devices may communicate information about the first responder, including location, health, and other status information concerning the first responder as well as the environment in which they are working.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
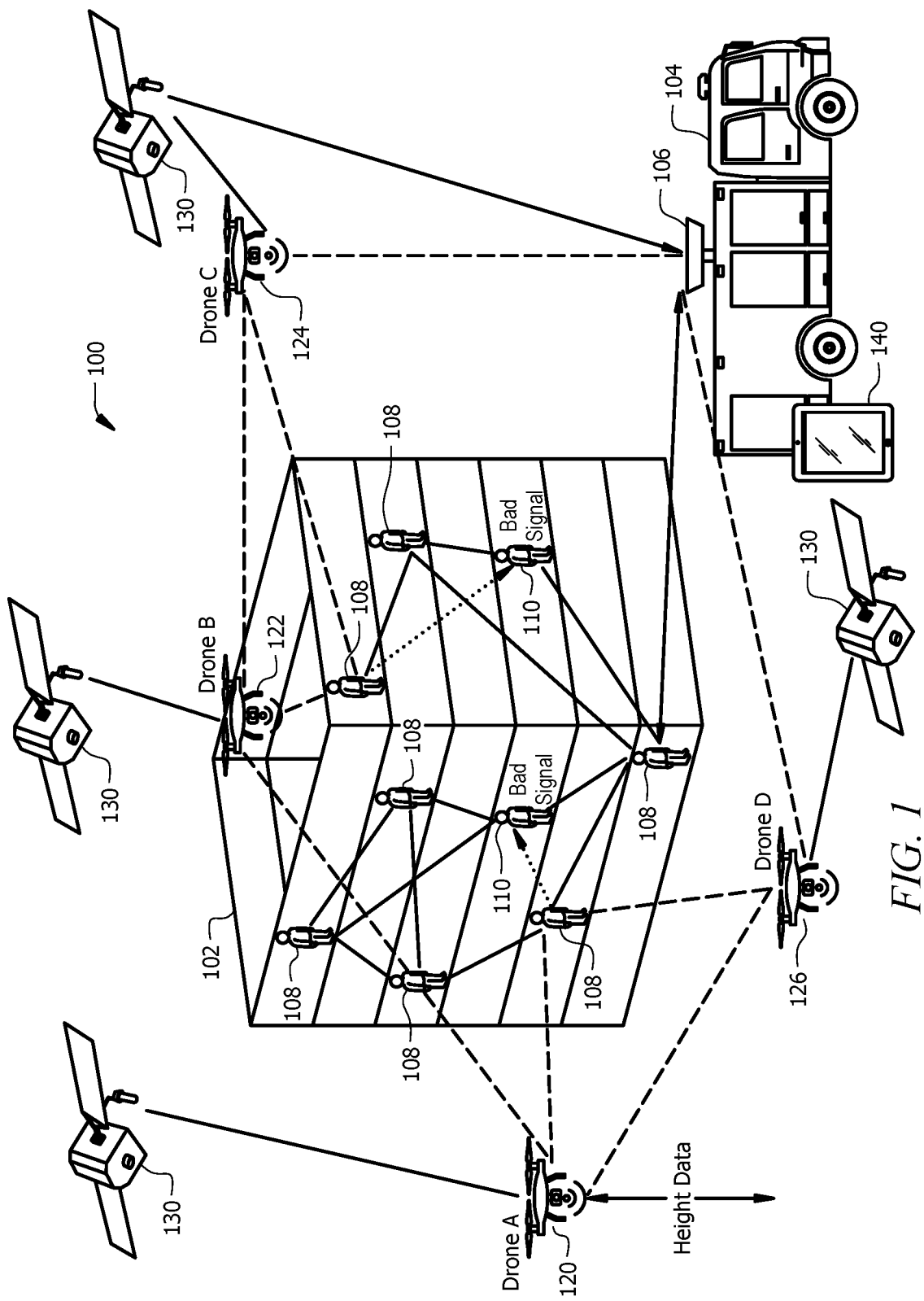
FIG. 1 illustrates a wireless communication system employing movable drones according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for using mobile drones as mobile access points for a mesh network, particularly in use for firefighters, or other first responders. It can be frightening to firefighters and first responders, or those who command them, if they become lost or disoriented during an emergency situation. To prevent confusion during an emergency, it may be important to identify the current location of each rescue team member (in three dimensions) to the supervisor (or incident command post) outside the building (or emergency situation). Additionally, devices may be used to provide status (health and motion) information on each team member, and on conditions in the exit path, provide emergency exit guidance, provide location precision of self and nearby fellow firefighter and his status on demand, and provide integration with other incident management communications. Providing this information and support depends upon the wireless connection between the firefighter(s) and the monitors.

Typically, when first responders enter the place of incident, an internal wireless ecosystem of the building (such as gateways and access points) may not be reliably available for access. This may be due to damage or electrical shutdown during the incident. Also, depending on fixed external access points may not provide sufficient wireless signal or coverage for the entire area occupied by the first responders. Typically, to track the first responders, a mesh network is created with help of fixed access points located on the exterior of the building (such as, on or near a firetruck) and individuals carrying mobile devices will act like moving nodes. As the first responders move throughout the building, they may not get sufficient signal and the network may fail.

Embodiments described herein provide a self-healing mesh network for improved wireless communication between the first responders and the external monitors. The self-healing mesh network may comprise mechanism drones operable to be deployed around a building or emergency area, wherein the drones can act as routers capable of automatically adjusting their position (thereby healing the wireless network) based on the signal needs for each individual located within the building.

In some cases, the system may include a handover mechanism, where a user may to connect with stronger signal drone without going out of range. The handover mechanism may allow the mobile devices to seamlessly change connection between access points (or between drones).

The drones may be used to provide more accurate position data for the first responders within the building, using X, Y and Z coordinates. Additionally, the drones may be light weight and simple to deploy and use. The use of movable drones to enhance the wireless communication security between the monitors and the first responders may increase the confidence level of those involved.

Referring now to FIG. 1, a communication system 100 is shown. The system 100 may be functioning around an emergency situation, such as a fire (or other issue) in a building 102 (or other structure). In some embodiments, a firetruck 104 or other emergency vehicle may be located outside of the building 102, and may comprise a stationary wireless access point 106 for communication with a plurality of mobile devices 108 and 110 carried by first responders located within and around the building 102. In some embodiments, a monitoring station 140 may be located on or near the truck 104, wherein the monitoring station may receive information from each of the mobile devices 108 and 110, and a supervisor can assess the situation within the building. In some embodiments, the monitoring station 140 may comprise a mobile device. In addition to the wireless access point 106, at least one drone 120, 122, 124, 126 may be deployed around the exterior of the building. The drones 120, 122, 124, 126 may comprise wireless routers, or other wireless communication capabilities, and may be operable to connect the mobile devices 108 and 110 carried by the first responders with the wireless access point 106.

In some embodiments, the drones 120, 122, 124, 126 may be automatically and/or manually controlled with the help of a control unit located in or around the truck. In some embodiments, the control unit may be incorporated into the monitoring station 140. The drones 120, 122, 124, 126 may also be fitted with heat sensors, cameras, and/or altimeters to keep the drones away from fire and prevent them from hitting external objects. In some embodiments, the first responders may be located in a multi-floor building, and the altimeter on the drones 120, 122, 124, 126 can be used for measuring the height, thereby reducing the error on the floor location for the firefighter.

As the drones will be located outside of an enclosed building, the connection between the drones, a GPS system 130, and the fixed access point(s) 106 should not be easily interrupted. The drones 120, 122, 124, 126 and monitoring station 140 will continually monitor the mobile devices 108 and 110 carried by the first responders with the help of status signals sent to the monitoring station 140 by the mobile devices 108 and 110.

In the embodiment shown in FIG. 1, when a first responder carrying a mobile device 110 moves into a dead zone of the network or the signal strength goes down, an automatic signal may be generated and forwarded to the monitoring station 140. In some embodiments, a mobile device 110 with bad signal may communicate with another mobile device 108 carried by a different first responder, wherein that signal may then be forwarded to the monitoring station 140. When this information is received by the monitoring station 140, an automatic signal may be sent to one or more of the drones 120, 122, 124, 126 to re-position themselves in order to gain the maximum signal strength.

In some embodiments, this process may proceed automatically, using communication between the drones, the mobile devices 108 and 110, and the monitoring station 140. In some embodiments, the positions of the drones 120, 122, 124, 126 may be automatically controlled by the monitoring station 140 and/or another device using an algorithm.

In some embodiments, a supervisor may manually adjust the position of one or more of the drones 120, 122, 124, 126 to optimize the signal strength for each of the mobile devices 108 and 110 carried by the first responders. The monitoring station 140 may show the most recently received signal strength and location of particular mobile device carried by a first responder, and a supervisor may use the monitoring station to move one or more of the drones 120, 122, 124, 126 with help of software to ensure the network is intact.

Figure 2:
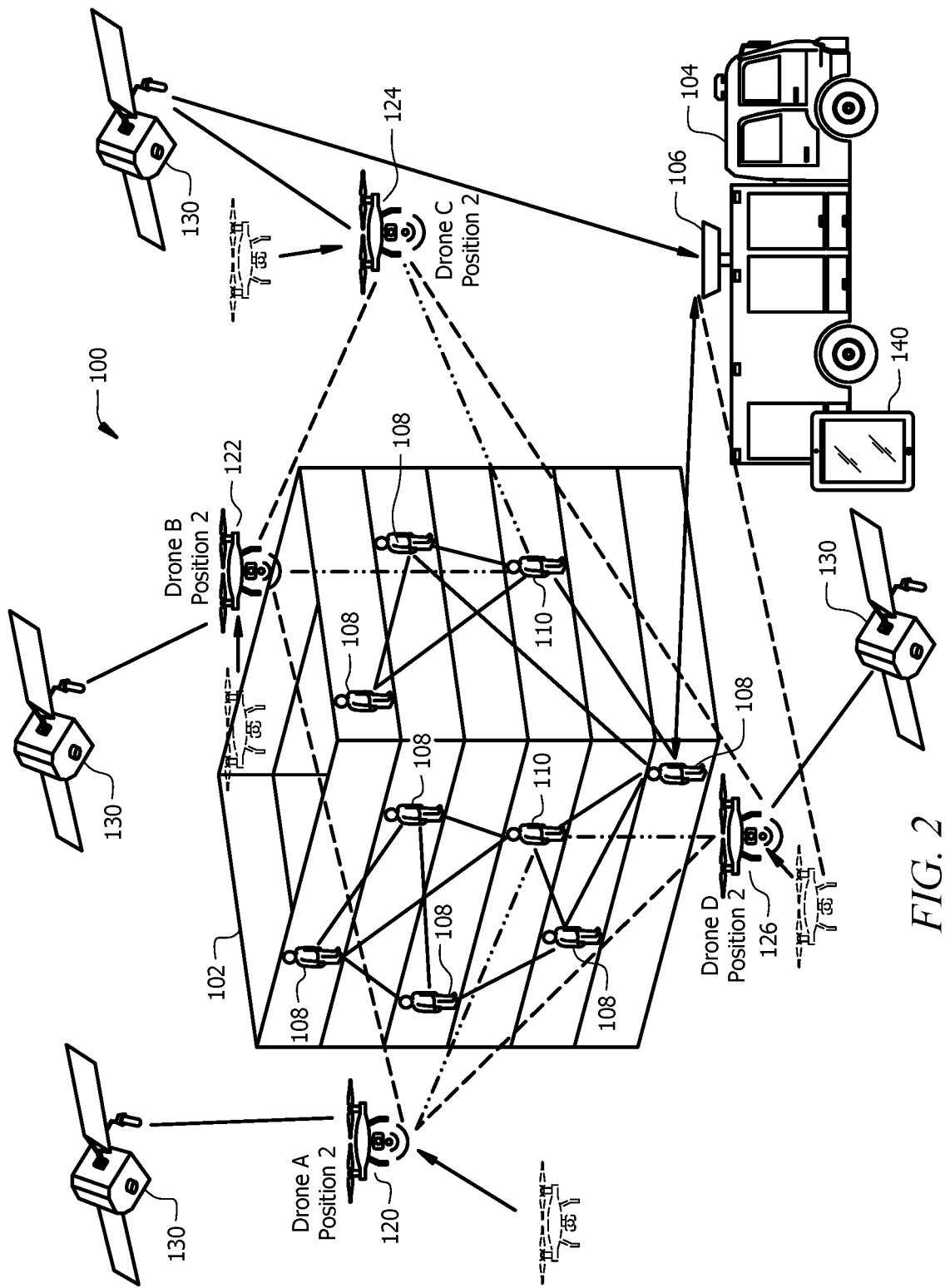
FIG. 2 illustrates the wireless communication system wherein the drones have changed position according to an embodiment of the disclosure.

FIG. 2 illustrates the same communication system 100 after the drones 120, 122, 124, 126 have been repositioned to provide increased signal strength to one or more of the mobile devices 110. The previous positions of the drones 120, 122, 124, 126 are shown in dashed lines for reference.

In some embodiments, the monitoring station 140 may be continually receiving signal status updates from the mobile devices 108 and 110, and the drones 120, 122, 124, 126 may be continually adjusting their positions in response to the signal status updates. In some embodiments, only one drone may be used with the stationary access point 106 to provide extended signal around a building or area. In some embodiments, a plurality of drones may be used with the stationary access point 106 to provide extended signal around a building or area (particularly a large building or area).

In some embodiments, the devices carried by the first responders may comprise gas detectors, respiratory systems, self-contained breathing apparatuses, activity or motion detectors, mobile devices, personal protection equipment, vitals detectors, etc.

Figure 3:
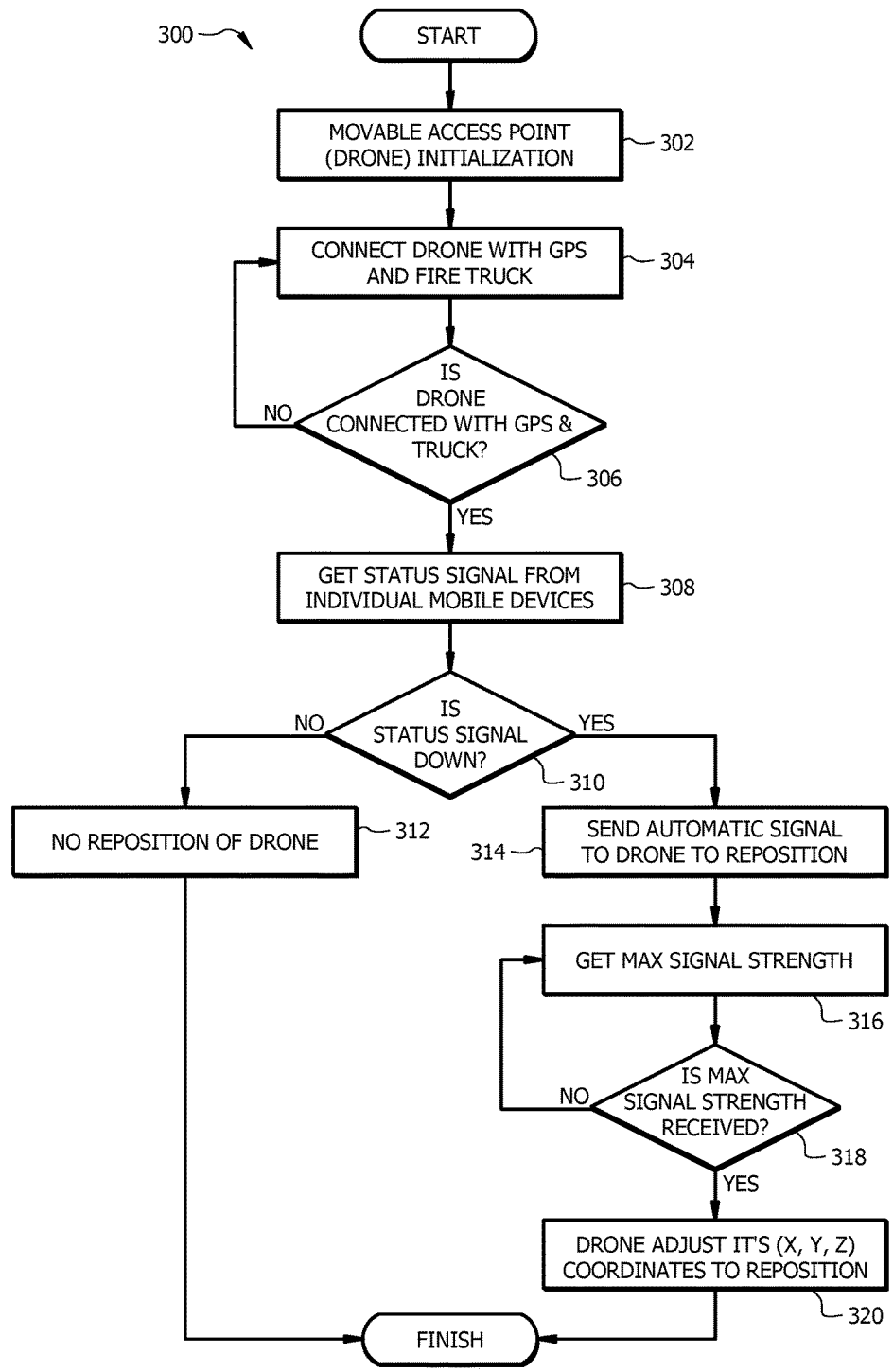
FIG. 3 illustrates a method according to an embodiment of the disclosure.

FIG. 3 illustrates a possible method 300 according to an embodiment of the disclosure. At step 302, one or more mobile access points (or drones) may be initialized. This may comprise deploying the drones around an emergency area. At step 304, the drones may be connected with a GPS system as well as an access point located on or near the fire truck. At step 306, it may be verified that the drones are connected to the GPS system and access point. When this is verified, at step 308, a monitoring station may receive signal status updates from individual mobile devices carried by the users within the emergency area. At step 310, it may be determined if one of the signal status updates indicates a lost or weak signal. If there is no lost or weak signal, at step 312, there may be no reposition of the drone(s). If there is a lost or weak signal, at step 314, an automatic signal may be sent to one or more drones to reposition. At step 316, the drone may attempt to establish the maximum signal strength for the device that lost signal. At step 318, it may be verified that the mobile device has reached maximum signal strength. If this is not true, the method may repeat. If this is true, at step 320, the drone may adjust its coordinates to reposition according to the maximum signal strength.

Embodiments of the disclosure include a method for adjusting the signal within a wireless network, wherein the method comprises providing one or more wireless access points on the exterior of a building, wherein the wireless access point comprise at least one movable drone; receiving location information from a plurality of mobile devices carried by users located in or around the building; receiving signal status updates from the plurality of mobile devices; when a signal status update indicates a poor or lost signal for a first mobile device, adjusting the location of the at least one movable drone to increase the signal for the first mobile device; and when a signal status update indicates a poor or lost signal for a second mobile device, adjusting the location of the at least one movable drone to increase the signal for the second mobile device.

In some embodiments, the method may further comprise continually adjusting the location of the at least one movable drone based on the received signal status updates. In some embodiments, adjusting the location of the at least one movable drone is controlled automatically by a monitoring station. In some embodiments, adjusting the location of the at least one movable drone is controlled manually using the monitoring station. In some embodiments, the at least one movable drone comprises a plurality of drones, and wherein the position of each of the drones are individually controlled and adjusted. In some embodiments, the signal status updates are continuously received throughout the use of the mobile devices within the building. In some embodiments, the at least one drone communicates directly with a GPS system. In some embodiments, the at least one drone comprises an altimeter operable to measure the height of the drone, and wherein this information is used to determine the vertical location of the mobile devices within the building. In some embodiments, the at least one drone comprises at least one heat sensor, and wherein the drone responds to the heat sensor to avoid fire or flames. In some embodiments, the at least one drone comprises at least one proximity sensor, and wherein the drone responds to the proximity sensor to avoid collisions with other objects. In some embodiments, the method may further comprise receiving status information from the mobile devices, such as gas readings, respiratory readings, vitals readings, motion readings, etc. In some embodiments, Additional embodiments of the disclosure may comprise a wireless communication system for use in emergency response situations, the system comprising a plurality of mobile devices carried by responders in an emergency area; at least one wireless access point operable to wirelessly communicate with the plurality of mobile devices; at least one movable drone operable to wirelessly communicate with the wireless access point and the plurality of mobile devices, wherein the movable drone is located around the emergency area; and a monitoring station operable to receive information from the mobile devices and the drone(s), wherein the monitoring station receives signal status updates from the plurality of mobile devices, and wherein, when a signal status update indicates a poor or lost signal for a mobile device, the location of the at least one movable drone is adjusted to increase the signal for the mobile device.

In some embodiments, the location of the at least one drone is continually adjusted based on the received signal status updates. In some embodiments, the monitoring station receives location information from the plurality of mobile devices. In some embodiments, the monitoring station receives status information from the mobile devices, such as gas readings, respiratory readings, vitals readings, motion readings, etc. In some embodiments, adjusting the location of the at least one movable drone is controlled automatically by the monitoring station. In some embodiments, adjusting the location of the at least one movable drone is controlled manually using the monitoring station. In some embodiments, the at least one movable drone comprises a plurality of drones, and wherein the position of each of the drones are individually and automatically controlled and adjusted. In some embodiments, the signal status updates are continuously received throughout the use of the mobile devices within the emergency area. In some embodiments, the at least one drone communicates directly with a GPS system. In some embodiments, the at least one drone comprises an altimeter operable to measure the height of the drone, and wherein this information is used to determine the vertical location of the mobile devices within the building. In some embodiments, the at least one drone comprises at least one heat sensor, and wherein the drone responds to the heat sensor to avoid fire or flames. In some embodiments, the at least one drone comprises at least one proximity sensor, and wherein the drone responds to the proximity sensor to avoid collisions with other objects.

In a first embodiment, a method for adjusting the signal within a wireless network may comprise providing one or more wireless access points on the exterior of a building, wherein the wireless access points comprise at least one movable drone; receiving location information from a plurality of mobile devices carried by users located in or around the building; receiving signal status updates from the plurality of mobile devices; when a signal status update indicates a poor or lost signal for a first mobile device, adjusting the location of the at least one movable drone to increase the signal for the first mobile device; and when a signal status update indicates a poor or lost signal for a second mobile device, adjusting the location of the at least one movable drone to increase the signal for the second mobile device.

A second embodiment can include the method of the first embodiment, further comprising continually adjusting the location of the at least one movable drone based on the received signal status updates.

A third embodiment can include the method of the first or second embodiments, wherein adjusting the location of the at least one movable drone is controlled automatically by a monitoring station.

A fourth embodiment can include the method of any of the first to third embodiments, wherein the at least one movable drone comprises a plurality of drones, and wherein the positions of each of the drones are individually and automatically controlled and adjusted.

A fifth embodiment can include the method of any of the first to fourth embodiments, wherein the signal status updates are continuously received throughout the use of the mobile devices within the building.

A sixth embodiment can include the method of any of the first to fifth embodiments, wherein the at least one drone comprises an altimeter operable to measure the height of the drone, and wherein this information is used to determine the vertical location of the mobile devices within the building.

A seventh embodiment can include the method of any of the first to sixth embodiments, further comprising receiving status information from the mobile devices, such as gas readings, respiratory readings, vitals readings, motion readings, etc.

In an eighth embodiment, a wireless communication system for use in emergency response situations may comprise a plurality of mobile devices carried by responders in an emergency area; at least one wireless access point operable to wirelessly communicate with the plurality of mobile devices; at least one movable drone operable to wirelessly communicate with the wireless access point and the plurality of mobile devices, wherein the movable drone is located around the emergency area; and a monitoring station operable to receive information from the mobile devices and the drone(s), wherein the monitoring station receives signal status updates from the plurality of mobile devices, and wherein when a signal status update indicates a poor or lost signal for a mobile device, the location of the at least one movable drone is adjusted to increase the signal for the mobile device.

A ninth embodiment can include the wireless communication system of the eighth embodiment, wherein the location of the at least one drone is continually and automatically adjusted based on the received signal status updates.

A tenth embodiment can include the wireless communication system of the eighth or ninth embodiments, wherein the monitoring station receives location information from the plurality of mobile devices.

An eleventh embodiment can include the wireless communication system of any of the eighth to tenth embodiments, wherein the monitoring station receives status information from the mobile devices, such as gas readings, respiratory readings, vitals readings, motion readings, etc.

A twelfth embodiment can include the wireless communication system of any of the eighth to eleventh embodiments, wherein the at least one movable drone comprises a plurality of drones, and wherein the positions of each of the drones are individually controlled and adjusted.

A thirteenth embodiment can include the wireless communication system of any of the eighth to twelfth embodiments, wherein the at least one drone communicates directly with a GPS system.

A fourteenth embodiment can include the wireless communication system of any of the eighth to thirteenth embodiments, wherein the at least one drone comprises an altimeter operable to measure the height of the drone, and wherein this information is used to determine the vertical location of the mobile devices within the building.

A fifteenth embodiment can include the wireless communication system of any of the eighth to fourteenth embodiments, wherein the at least one drone comprises at least one heat sensor, and wherein the drone responds to the heat sensor to avoid fire or flames.

A sixteenth embodiment can include the wireless communication system of any of the eighth to fourteenth embodiments, wherein the at least one drone comprises at least one proximity sensor, and wherein the drone responds to the proximity sensor to avoid collisions with other objects.

In a seventeenth embodiment, a wireless communication system for use in emergency response situations may comprise a plurality of mobile devices carried by responders in an emergency area; a monitoring station configured to receive information including signal status updates from the plurality of mobile devices; and at least one movable drone operable to wirelessly communicate with plurality of mobile devices and with the monitoring station, wherein the movable drone is configured to be relocated with respect to the plurality of mobile devices to improve the signal for at least one of the plurality of mobile devices.

An eighteenth embodiment can include the wireless communication system of the seventeenth embodiment, further comprising at least one wireless access point operable to facilitate wireless communication between the monitoring station, the plurality of mobile devices, and the at least one movable drone.

A nineteenth embodiment can include the wireless communication system of the seventeenth or eighteenth embodiments, wherein the signal status updates are continuously received throughout the use of the mobile devices within the emergency area.

A twentieth embodiment can include the wireless communication system of any of the seventeenth to nineteenth embodiments, wherein adjusting the location of the at least one movable drone is controlled automatically by a monitoring station.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for adjusting a signal within a wireless network, the method comprising:
   providing one or more wireless access points on an exterior of a building, wherein the one or more wireless access points comprise at least one movable drone;
   receiving location information from a plurality of mobile devices carried by users located in or around the building;
   receiving signal status updates from the plurality of mobile devices;
   when a signal status update indicates a poor or lost signal for a first mobile device, adjusting a location of the at least one movable drone to increase the signal for the first mobile device; and
   when a signal status update indicates a poor or lost signal for a second mobile device, adjusting the location of the at least one movable drone to increase the signal for the second mobile device; and
   wherein the at least one movable drone comprises an altimeter operable to measure a height of the at least one movable drone, and wherein measurement of the height of the at least one movable drone is used to determine a vertical location of the plurality of mobile devices within the building.

2. The method of claim 1, further comprising continually adjusting the location of the at least one movable drone based on the received signal status updates.

3. The method of claim 1, wherein adjusting the location of the at least one movable drone is controlled automatically by a monitoring station.

4. The method of claim 1, wherein the at least one movable drone comprises a plurality of drones, and wherein positions of each of the plurality of drones are individually and automatically controlled and adjusted.

5. The method of claim 1, wherein the signal status updates are continuously received throughout the use of the plurality of mobile devices within the building.

6. The method of claim 1, further comprising receiving status information from the plurality of mobile devices, wherein the status information corresponds to gas readings, respiratory readings, vitals readings, or motion readings.

7. A wireless communication system for use in emergency response situations, the system comprising:
   a plurality of mobile devices carried by responders in an emergency area;
   at least one wireless access point operable to wirelessly communicate with the plurality of mobile devices;
   at least one movable drone operable to wirelessly communicate with the at least one wireless access point and the plurality of mobile devices, wherein the at least one movable drone is located around the emergency area; and
   a monitoring station operable to receive information from the plurality of mobile devices and the at least one movable drone,
   wherein:
      the monitoring station receives signal status updates from the plurality of mobile devices;
      when a signal status update indicates a poor or lost signal for a mobile device, the location of the at least one movable drone is adjusted to increase the signal for the mobile device; and
      wherein the at least one movable drone comprises an altimeter operable to measure a height of the at least one movable drone, and wherein measurement of the height of the at least one movable drone is used to determine a vertical location of the plurality of mobile devices within a building.

8. The wireless communication system of claim 7, wherein the location of the at least one movable drone is continually and automatically adjusted based on the received signal status updates.

9. The wireless communication system of claim 7, wherein the monitoring station receives location information from the plurality of mobile devices.

10. The wireless communication system of claim 7, wherein the monitoring station receives status information from the plurality of mobile devices, wherein the status information corresponds to gas readings, respiratory readings, vitals readings, or motion readings.

11. The wireless communication system of claim 7, wherein the at least one movable drone comprises a plurality of drones, and wherein positions of each of the plurality of drones are individually controlled and adjusted.

12. The wireless communication system of claim 7, wherein the at least one movable drone communicates directly with a GPS system.

13. The wireless communication system of claim 7, wherein the at least one movable drone comprises at least one heat sensor, and wherein the at least one movable drone responds to the at least one heat sensor to avoid fire or flames.

14. The wireless communication system of claim 7, wherein the at least one movable drone comprises at least one proximity sensor, and wherein the at least one movable drone responds to the at least one proximity sensor to avoid collisions with other objects.

15. A wireless communication system for use in emergency response situations, the system comprising:
   a plurality of mobile devices carried by responders in an emergency area;
   a monitoring station configured to receive information including signal status updates from the plurality of mobile devices; and
   at least one movable drone operable to wirelessly communicate with the plurality of mobile devices and with the monitoring station,
   wherein the at least one movable drone is configured to be relocated with respect to the plurality of mobile devices to improve a signal for at least one of the plurality of mobile devices, and
   wherein the at least one movable drone comprises an altimeter operable to measure a height of the at least one movable drone, and wherein measurement of the height of the at least one movable drone is used to determine a vertical location of the plurality of mobile devices within a building.

16. The wireless communication system of claim 15, further comprising at least one wireless access point operable to facilitate communication between the monitoring station, the plurality of mobile devices, and the at least one movable drone.

17. The wireless communication system of claim 15, wherein the signal status updates are continuously received throughout the use of the plurality of mobile devices within the emergency area.

18. The wireless communication system of claim 15, wherein adjusting the location of the at least one movable drone is controlled automatically by the monitoring station.

\* \* \* \* \*